April 28, 1970 M. E. PARTIN 3,509,534

CHARACTER RECOGNITION APPARATUS

Filed Sept. 20, 1965 2 Sheets-Sheet 1

INVENTOR.
MELVIN E. PARTIN

BY Fordyce A. Bothwell

ATTORNEY

INVENTOR.
MELVIN E. PARTIN
BY
Fordyce A. Bothwell
ATTORNEY

United States Patent Office 3,509,534
Patented Apr. 28, 1970

3,509,534

CHARACTER RECOGNITION APPARATUS

Melvin E. Partin, Montgomeryville, Pa., assignor to Philco-Ford Corporation, Philadelphia, Pa., a corporation of Delaware Filed Sept. 20, 1965, Ser. No. 488,659
Int. Cl. G06k 9/10
U.S. Cl. 340—146.3 3 Claims

ABSTRACT OF THE DISCLOSURE

Character recognition apparatus utilizing character scansion with an elongate light image composed of a plurality of serially-arranged light images, each modulated differently from the others. A single photocell receives reflected light from all three images and produces an electrical signal which is supplied to a plurality of filters having differently-shaped passbands. The output of each filter is differentiated and then rectified to produce pulses which are counted to determine the identity of the scanned character.

This invention relates to apparatus of the type which is adapted to read or recognize characters such as typed or printed letters. More particularly, the invention relates to that type of apparatus which utilizes light scanning of a character to be recognized.

A desirable form of scanning arrangement for such apparatus is one in which an elongate light image is caused to scan the entire character to be recognized in a single scanning motion. Ordinarily, however, such scanning of a character does not provide sufficient information to insure accurate identification of the character.

In my copending application, Ser. No. 443,814, filed Mar. 30, 1965, assigned to the assignee of the present application, I disclose the concept of producing by such scanning plural electrical waveforms which are respectively representative of the scanned character as viewed panoramically through respective plural masks having different transparency patterns. Such waveforms can be readily utilized to identify the character, for example by differentiating the waveforms to produce derivative waveforms in which the number of positive and negative excursions may serve to identify the character. One way of producing such waveforms is to employ a plurality of mask and associated photocells such that the light received from the character by each photocell passes through a unique mask, whereby the signal generated by each photocell will have a unique waveform.

One object of the present invention is to provide apparatus by which it is possible to achieve the same results without the necessity of using masks.

Another object of the invention is to provide such an apparatus wherein plural waveforms representative of the scanned character and generally similar to those above mentioned are produced by the utilization of frequency discriminatory means rather than by the use of masks.

Other objects and features of the invention will be apparent from the following detailed description with reference to the accompanying drawings wherein.

Figure 1:
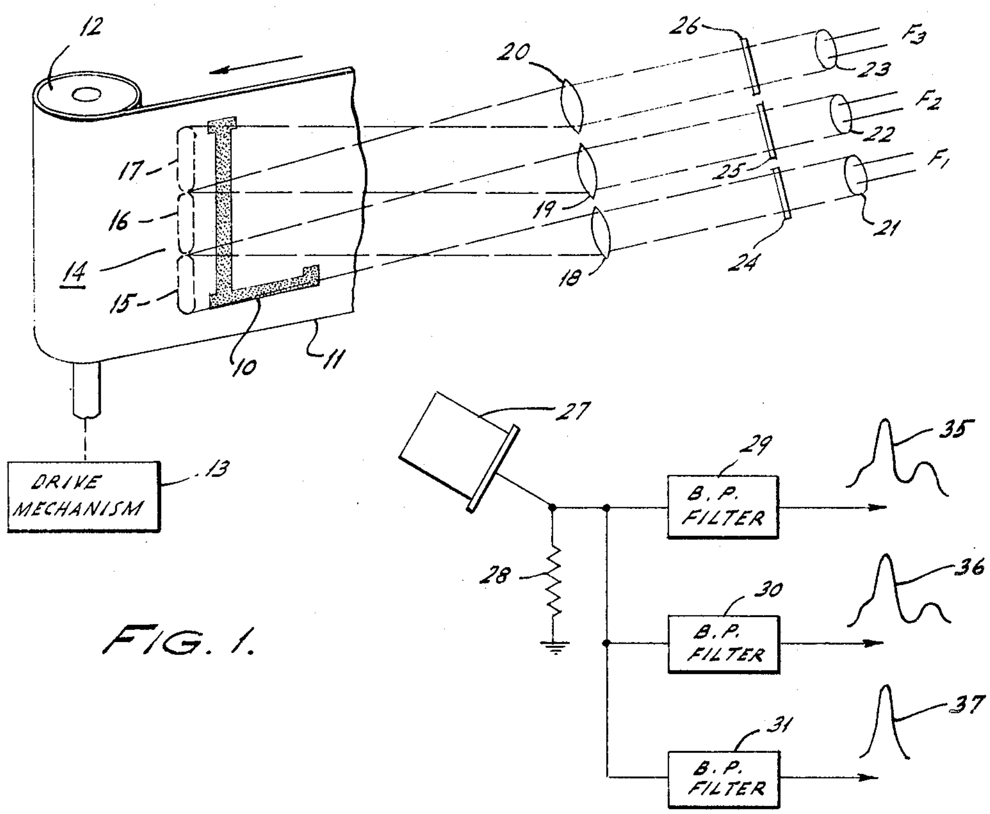
FIG. 1 is a schematic illustration of a scanning arrangement according to the present invention.

Referring first to FIG. 1, a character 10 to be recognized, here the capital letter L, is carried on the surface of a supporting web 11 which is moved in the direction of the arrow by a conventional mechanism such as a take-up roll 12 and a drive mechanism 13. In the course of such movement of character 10, it is scanned by a stationary elongate light image 14 which is constituted by serially arranged light images. For simplicity only three constituent light images 15, 16 and 17 are shown. The latter are formed by projecting elongate light beams through image-projection optical means represented by lenses 18, 19 and 20, the elongate light beams being formed by passing light from sources 21, 22, and 23 through elongate openings or windows of disks 24, 25, and 26, which are otherwise opaque.

The projected light beams are mutually distinguished by being modulated at different frequencies $F_1$, $F_2$, and $F_3$. The modulation may be effected by energizing light sources, such as neon lamps, at said different frequencies. Other possible methods would be to use light choppers or to use as the light sources cathode ray tubes whose beams are moved in straight lines and are modulated at different frequencies to produce differently modulated elongate light images, thus enabling the elimination of disks 24 to 26. In one physical embodiment of the invention employing three modulated neon lamps, frequencies of 117 kHz., 145 kHz., and 198 kHz., respectively, were used.

Figure 2:
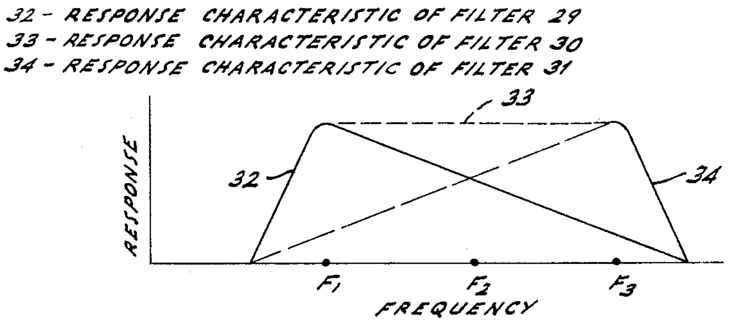
FIG. 2 illustrates the frequency response characteristics of the several channels of the apparatus.

In the course of scanning of character 10 by light image 14, the reflected light from the character is received by a photomultiplier 27 and is translated thereby into an electrical signal which appears across load resistor 28. The signal is supplied to bandpass filters 29 to 31 which have different response characteristics within a frequency band including the frequencies $F_1$ to $F_3$, as shown in FIG. 2. Filter 29 has the response characteristic 32 which provides maximum transmissivity in the vicinity of frequency $F_1$ and which provides decreasing transmissivity through frequencies $F_2$ and $F_3$. Filter 30 has the response characteristic 33 which is uniform throughout the frequency range $F_1$ to $F_3$. Filter 31 has the response characteristic 34 which provides least transmissivity in the vicinity of frequency $F_1$ and which provides increasing transmissivity through frequencies $F_2$ and $F_3$. In one case the output signals from the filters had the waveforms 35, 36, and 37.

Figure 3:
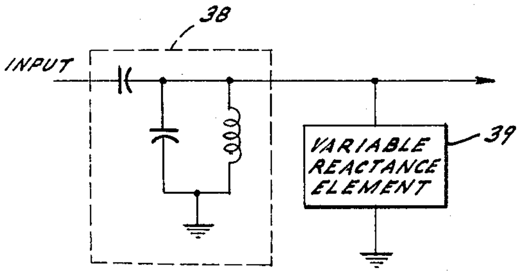
FIG. 3 is an illustration of a simple network which may be employed to provide asymmetrical handpass characteristics in some of said channels.

The frequency response characteristics shown in FIG. 2 are readily attainable. Characteristic 33 is of course the normal bandpass characteristic which is provided by the conventional bandpass filter. Characteristics 32 and 34 can be attained by bandpass filter arrangements such as that shown in FIG. 3 comprising a tuned network 38 and one or more associated reactance elements represented by block 39 which may be variable to enable change of the response characteristic.

The waveforms 35, 36, and 37 are substantially the same as those produced by means of masks as hereinbefore mentioned. Thus these waveforms are representative of the character 10 as viewed panoramically through plural masks having different transparency patterns. Waveform 35 is representative of the character 10 as viewed panoramically through a mask having maximum transparency at the bottom and decreasing transparency from bottom to top. Waveform 36 is representative of the character as viewed through a mask of uniform transparency. Waveform 37 is representative of the character as viewed through a mask having maximum transparency at the top and decreasing transparency from top to bottom. While the signal appearing across load resistor 28 is produced by reflected light from all of the light sources 21 to 23, the filters 29 to 31 respond differently to the components in this signal.

Figure 4:
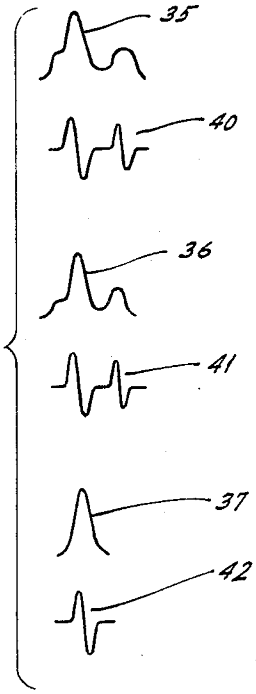
FIG. 4 is an illustration of waveforms which are utilized in the determination of the scanned character.

The character represented by the three waveforms 35, 36, and 37 can be identified by differentiating the wave forms to produce derivative waveforms as shown in FIG. 4 at 40, 41, and 42, and by determining the number of positive and neagtive excursions of each of the derivative waveforms. In waveforms 40 and 41 there are two positive excursions and two negative excursions, while in waveform 42 there is one positive excursion and one negative excursion. Thus the excursions of the three derivative waveforms can be said to form the code 2, 2, 2, 2, 1, 1, which represents the scanned letter L.

Figure 5:
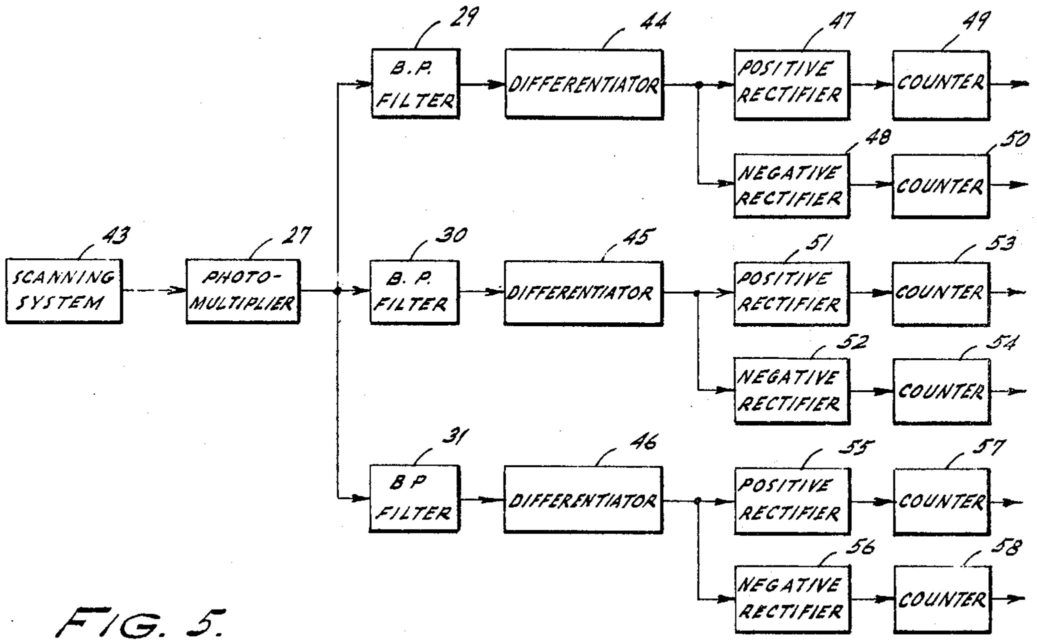
FIG. 5 is a block diagram of a character recognition system according to the present invention.

Referring now to FIG. 5, there is shown a character recognition system employing the above-described scanning arrangement. Block 43 represents the scanning arrangement of FIG. 1. The photomultiplier 27 and filters 29, 30, and 31 are represented by the so-numbered blocks. The outputs of the filters are supplied respectively to differentiators 44, 45, and 46 to produce the derivative waveforms 40, 41, and 42 of FIG. 4. Waveform 40 is supplied to positive and negative rectifiers 47 and 48 which produce positive and negative pulses that are supplied to counters 49 and 50, said pulses corresponding to the excursions of said waveform. Waveform 41 is supplied to positive and negative rectifiers 51 and 52 which produce positive and negative pulses that are supplied to counters 53 and 54. Waveform 42 is supplied to positive and negative rectifiers 55 and 56 which produce positive and negative pulses that are supplied to counters 57 and 58. At the end of the scan the counters may be sampled to read the code and thus determine the scanned character.

The invention has been described, by way of example, with reference to recognition or reading of the capital letter L. It is similarly applicable to recognition of other letters of the alphabet, numerics, symbols, patterns, etc.

For simplicity the system as illustrated comprises only three projected beams and three bandpass filters, but any practical number consistent with the purpose of the invention may be employed. Thus the projected light images might be small enough so that the resultant elongate image 14 may be considered as being modulated by a continuously varying frequency function along its length. With cathode ray tube sources, frequencies as high as 50 mHz. could be used.

When the reactance element 39 (FIG. 3) is variable, it greatly enhances the versatility of the system. Not only does this element enable change of the pattern to obtain more data for recognition purposes, but it also lends itself to automatic control by a control signal for any purpose.

While the invention has been described with reference to the particular embodiment illustrated, it will be understood that the invention is not limited thereto but contemplates such modifications and further embodiments as may occur to those skilled in the art.

I claim:

1. Character recognition apparatus, comprising:

means for producing an elongate light image composed of a series of constituent light images, each image being modulated at a frequency different from those at which the others of said images are modulated, means for scanning a character with said elongate light image, a photocell responsive to light of said elongate image, received from said character, to produce an electrical signal, a plurality of bandpass filters having different response characteristics within a frequency band including said frequencies, said filters being responsive to said electrical signal for producing a plurality of output signals representative of said image light received from said character, means for differentiating said output signals to produce derivative signals, means for deriving positive and negative pulses corresponding to the positive and negative excursions of said derivative signals, and means for counting positive and negative pulses derived from each of said derivative signals, thereby to determine the identity of said character.

2. The apparatus of claim 1 wherein at least some of said bandpass filters include a variable reactance element.

3. Character recognition apparatus, comprising:

a surface containing a character to be recognized, means for projecting onto said surface a plurality of light beams, each beam being modulated differently from the others, so as to produce on said surface an elongate light image constituted by serially-arranged light images formed by the respective light beams, means for producing relative motion between said surface and said elongate light image so as to effect scanning of said character by said elongate image, means responsive to light of said elongate image, received from said character, to produce an electrical scan signal, plural means, each arranged to receive said scan signal and having a response to said scan signal different from the responses thereto of others of said plural means, for producing a plurality of output signals, means responsive to said plurality of output signals for providing an indication of the identity of said character, said means comprising a corresponding plurality of means for differentiating said respective output signals, and means, coupled to the output of each differentiating means, for counting pulses, said means for counting pulses comprising a plurality of positive rectifiers and a plurality of negative rectifiers, each rectifier being connected to the output of one of said means for differentiating, and a plurality of counters, each connected to count the output pulses from a different one of said rectifiers.

References Cited

UNITED STATES PATENTS

| | | | |
|---|---|---|---|
| 2,380,667 | 7/1945 | Morrison | 340—146.3 X |
| 2,961,649 | 11/1960 | Eldredge et al. | |
| 3,261,916 | 7/1966 | Bakis. | |
| 3,051,897 | 8/1962 | Peterson | 324—77 |
| 3,264,611 | 8/1966 | Lohmann | 340—146.3 |
| 3,354,432 | 11/1967 | Lamb | 340—146.3 |

FOREIGN PATENTS

| | | | |
|---|---|---|---|
| 1,088,745 | 9/1960 | Germany. | |

DARYL W. COOK, Primary Examiner

L. H. BOUDREAU, Assistant Examiner

U.S. Cl. X.R.

250—219